(12) United States Patent
Hasan

(10) Patent No.: US 7,254,458 B2
(45) Date of Patent: *Aug. 7, 2007

(54) SYSTEMS AND METHODS FOR METROLOGY RECIPE AND MODEL GENERATION

(75) Inventor: Talat Fatima Hasan, Saratoga, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/471,992

(22) Filed: Jun. 21, 2006

(65) Prior Publication Data

US 2006/0247818 A1   Nov. 2, 2006

Related U.S. Application Data

(63) Continuation of application No. 10/132,553, filed on Apr. 24, 2002, now Pat. No. 7,089,075.

(60) Provisional application No. 60/288,748, filed on May 4, 2001.

(51) Int. Cl.
*G06F 19/00* (2006.01)

(52) U.S. Cl. ............... 700/121; 700/109

(58) Field of Classification Search ........... 700/121, 700/108, 109–110; 702/83, 84
See application file for complete search history.

(56) References Cited

U.S. PATENT DOCUMENTS

| | | | |
|---|---|---|---|
| 5,270,222 A | 12/1993 | Moslehi | 438/7 |
| 5,288,379 A | 2/1994 | Namiki et al. | 204/192.12 |
| 5,393,624 A | 2/1995 | Ushijima | 430/30 |
| 5,442,416 A | 8/1995 | Tateyama et al. | 354/319 |
| 5,461,559 A | 10/1995 | Heyob et al. | 700/29 |
| 5,474,410 A | 12/1995 | Ozawa et al. | 414/217 |
| 5,492,594 A | 2/1996 | Burke et al. | 216/86 |
| 5,611,655 A | 3/1997 | Fukasawa et al. | 414/217 |
| 5,616,063 A | 4/1997 | Okumura et al. | 451/1 |
| 5,655,110 A | 8/1997 | Krivokapic et al. | 716/19 |
| 5,695,601 A | 12/1997 | Kodera et al. | 156/636.1 |
| 5,740,034 A | 4/1998 | Saeki | 700/59 |
| 5,766,360 A | 6/1998 | Sato et al. | 118/666 |
| 5,948,203 A | 9/1999 | Wang | 156/345 |
| 5,966,312 A | 10/1999 | Chen | 703/6 |

(Continued)

FOREIGN PATENT DOCUMENTS

JP   11-220004   8/1999

OTHER PUBLICATIONS

G. Dishon et al., "Dielectric CMP Advanced Process Control Based on Integrated Thickness Monitoring," *CMP-MIC Conference 1998 IMIC*, vol. 300P, Feb. 19-20, 1998, pp. 267-274.

(Continued)

*Primary Examiner*—Zoila Cabrera
(74) *Attorney, Agent, or Firm*—Stallman & Pollock LLP

(57) ABSTRACT

Systems and methodologies are disclosed for generating setup information for use measuring process parameters associated with semiconductor devices. A system comprises an off-line measurement instrument to measure an unpatterned wafer and a setup information generator to generate setup information according to the unpatterned wafer measurement. The system then provides the setup information to a process measurement system for use in measuring production wafers in a semiconductor manufacturing process.

14 Claims, 11 Drawing Sheets

U.S. PATENT DOCUMENTS

| | | | |
|---|---|---|---|
| 5,996,415 A | 12/1999 | Stanke et al. | 73/597 |
| 6,019,000 A | 2/2000 | Stanke et al. | 73/622 |
| 6,021,380 A | 2/2000 | Fredriksen et al. | 702/35 |
| 6,028,664 A | 2/2000 | Cheng et al. | 356/237.4 |
| 6,112,595 A | 9/2000 | Stanke et al. | 73/597 |
| 6,157,450 A | 12/2000 | Marchese-Ragona et al. | 356/376 |
| 6,162,010 A | 12/2000 | Ishizawa et al. | 414/805 |
| 6,166,801 A | 12/2000 | Dishon et al. | 355/27 |
| 6,177,287 B1 | 1/2001 | Steffan et al. | 438/14 |
| 6,182,510 B1 | 2/2001 | Stanke et al. | 73/597 |
| 6,362,116 B1 | 3/2002 | Lansford | 438/781 |
| 6,368,181 B1 | 4/2002 | Dvir et al. | 451/6 |
| 6,556,947 B1 | 4/2003 | Scheiner et al. | 702/172 |
| 6,580,961 B2 | 6/2003 | Diggin et al. | 700/121 |
| 6,673,637 B2 | 1/2004 | Wack et al. | 438/14 |
| 6,684,122 B1 | 1/2004 | Christian et al. | 700/121 |
| 6,917,433 B2 | 7/2005 | Levy et al. | 356/630 |
| 2001/0039462 A1 | 11/2001 | Mendez et al. | 700/45 |
| 2002/0090744 A1 | 7/2002 | Brill et al. | 438/11 |
| 2002/0156548 A1 | 10/2002 | Arackaparambil et al. | 700/108 |
| 2002/0188417 A1* | 12/2002 | Levy et al. | 702/155 |
| 2004/0083021 A1 | 4/2004 | Somekh et al. | 700/121 |

OTHER PUBLICATIONS

G. Dishon et al., "On-line Integrated Metrology for CMP Processing," *CMP-MIC Conference 1996 ISMIC*, vol. 100P, Feb. 22-23, 1996, pp. 273-276.

G. Dishon et al. "Monitoring Choices of CMP Planarization Processes," *Reprinted from: VMIC Specialty Conferences, 2nd International CMP Planarization Conference*, Santa Clara, California, Feb. 13-14, 1997, 13 pages in length.

* cited by examiner

SYSTEMS AND METHODS FOR METROLOGY RECIPE AND MODEL GENERATION

CROSS REFERENCE TO RELATED APPLICATION

This application is a continuation of U.S. patent application Ser. No. 10/132,553, filed Apr. 24, 2002 now U.S. Pat. No. 7,089,075. This application also claims the benefit of U.S. Provisional Application Ser. No. 60/288,748, entitled "Systems And Method For Metrology Recipe And Model Generation" and filed on May 4, 2001, the entirety of which is incorporated herein by reference.

TECHNICAL FIELD

The present invention relates to the art of semiconductor device manufacturing and fabrication, and more particularly to optimized systems and methodologies for creating setup information for semiconductor device measurement systems.

BACKGROUND OF THE INVENTION

In the semiconductor industry there is a continuing trend toward higher device densities. To achieve these high densities there have been, and continue to be, efforts toward scaling down the device dimensions on semiconductor wafers. In order to accomplish such a high device packing density, smaller feature sizes are required. These may include the width and spacing of interconnecting lines and the surface geometry such as the corners and edges of various features. The requirement of small features with close spacing between adjacent features requires high-resolution photo-lithographic processes as well as high resolution metrology and inspection instruments and systems.

Lithography refers generally to processes for pattern transfer between various media. It is a technique used for integrated circuit fabrication in which, for example, a silicon wafer is coated uniformly with a radiation-sensitive film (e.g., a photoresist), and an exposing source (such as ultraviolet light, x-rays, or an electron beam) illuminates selected areas of the film surface through an intervening master template (e.g., a mask or reticle) to generate a particular pattern. The exposed pattern on the photoresist film is then developed with a solvent called a developer which dissolves either the exposed pattern or the complimentary unexposed pattern, depending on the type of photoresist (i.e., positive or negative resist). After developing, the wafer has a photoresist mask corresponding to the desired pattern on the silicon wafer for further processing.

In addition to lithographic processes, other process steps in the fabrication of semiconductor wafers require higher resolution processing and measurement equipment in order to accommodate ever shrinking feature sizes and spacing. Measurement instruments and systems are used to inspect semiconductor devices in association with manufacturing production line quality control applications as well as with product research and development. The ability to measure and/or view particular features in a semiconductor workpiece allows for adjustment of manufacturing processes and design modifications in order to produce better products, reduce defects, etc. For instance, device measurements of film thicknesses, critical dimensions (CDs), profiles, and overlay registration may be used to make adjustments in one or more such process steps in order to achieve the desired product quality. Accordingly, various metrology and inspection tools and instruments have been developed to map and record semiconductor device features, such as scanning electron microscopes (SEMs), atomic force microscopes (AFMs), scatterometers, spectroscopic ellipsometers (SEs), and the like.

One particular type of measurement system is a scatterometer, which is different from conventional film measurements.. Scatterometry is a technique for extracting information about a structure or stacked structures upon which an incident light has been directed. In particular, scatterometry involves extracting information from gratings over other gratings or from gratings over a film stack. As indicated by its name, scatterometry is primarily concerned with the shapes of two and three dimensional structures in order to ascertain and determine the roughness of the layers or the non-planarity or non-parallelism of the planes. The structures of interest scatter light in ways that flat, one-dimensional layers do not. Process information concerning properties such as profile and critical dimensions of features present on and within the stacked structure can be extracted by employing a scatterometer. Using scatterometry, this information can be obtained by comparing measured and calculated signatures relating to the stacked structure. A signature may be defined as the phase and/or intensity of the light directed onto the surface of a wafer with phase and/or intensity signals of a complex reflected. and/or diffracted light resulting from the incident light reflecting from and/or diffracting through the surface upon which the incident light was directed.

Conventional film metrology involves treating volumes which are essentially one-dimensional, that is composed of layers such as sub-volumes separated by parallel planes. In scatterometry, the intensity and/or the phase of the reflected and/or diffracted light change according to properties of the stacked structure. Examples of such properties include the roughness of the layers and the non-planarity or non-parallelism of the subject plane(s) upon which the light is directed.

Different combinations of such properties will have different effects on the phase and/or intensity of the incident light resulting in substantially unique signatures in the complex reflected and/or diffracted light. Thus, by examining a database of calculated signatures or model of calculated signatures, a determination can be made concerning the properties of the stacked structure. For instance, a measured signature may be matched to a calculated signature, thereby yielding a measured profile of the stacked structure or a portion thereof. Such substantially unique signatures are produced by light reflected from and/or refracted by different surfaces due, at least in part, to the complex index of refraction of the surface onto which the light is directed.

The complex index of refraction (N) can be computed by examining the index of refraction (n) of the surface and an extinction coefficient (k). One such computation of the complex index of refraction can be described by the equation $N=n-jk$, where j is an imaginary number.

Generally, the n and k values for a given surface layer may be measured using a spectroscopic ellipsometer (SE), which may be used, in part, to generate such signature models in a semiconductor manufacturing endeavor. "Unpatterned wafer" means "an unpatterned portion of a wafer". Optical instruments, e.g., an SE or a scatterometer, have a "spot size" of some size which defines the region where the instrument is sensitive. If a wafer has regions which are essentially uniform ("unpatterned") as large as the spot size, those portions can be measured as "unpatterned" even though the wafer elsewhere has patterns, if the "spot" is placed on unpatterned on uniform regions. When exposed to a first incident light of known intensity, wavelength and phase, a first layer with a first chemical composition on a wafer can generate a first phase/intensity signature. Similarly, when exposed to the first incident light of known intensity, wavelength and phase, a second chemical composition on a wafer can generate a second phase/intensity signature. For example, a nitrided gate oxide layer with a first nitrogen concentration may generate a first signature while a nitrided gate oxide layer with a second nitrogen concentration may generate a second signature.

Observed signatures can be combined with simulated and modeled signatures to form the signal (signature) library. Simulation and modeling can be employed to produce signatures against which measured signatures can be matched, for instance, using a profile matching server or system. When phase/intensity signals are received from scatterometry detecting components, the phase/intensity signals can be pattern matched, for example, to the library models of signals, in order to determine whether the signals correspond to a stored signature.

Scatterometry may thus be advantageously employed in a semiconductor device manufacturing or fabrication process, in order to measure certain process parameters associated with individual processing steps therein. For example, a lithography process step may involve patterning wafers in order to create features thereon having certain critical dimensions (CDs), profiles, spacings, etc., wherein the overall quality of the resulting semiconductor device may depend on the accuracy of the lithography step. Scatterometry may be employed in order to verify such dimensional process parameters, as well as other process conditions, such as overlay registration, and the like. Today, such model generation is typically done remotely from the process and scatterometer with which the models are ultimately to be employed. In order to setup a scatterometer for use with a new or changed process step, such models must be obtained, along with recipes for performing one or more required measurements on processed wafers.

Obtaining models from such remote model generation sites sometimes takes days, during which time wafers processed according to the new process step cannot be measured using the scatterometer. In addition, the scatterometry measurement system may need to be trained in order to program new measurement recipes, during which time the scatterometer cannot be used to measure production wafers. Thus, the generation and/or creation of setup information such as models and recipes for use in measurement systems has heretofore resulted in significant process down-time. Accordingly, there is a need for improved methods and systems by which such setup down-time may be reduced or mitigated.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides systems and methodologies for generating setup information for use in determining process parameters associated with semiconductor devices. The systems may be employed off-line, that is, apart from an active, on-going semiconductor fabrication process, to generate setup information for downloading to active-process measurement tools, such that the active-process tools may be kept running during setup information generation. In addition, the systems, though off-line, may be interconnected to the active fabrication process via a bus configuration system, whereby measured and calculated information relating to a subject structure may be obtained by and shared with the active fabrication process system as well as other measurement systems and process tools as needed or desired. The bus configuration system allows for information to be available to the various connected measurement systems, tools and instruments almost immediately after the respective information becomes available. Furthermore, such systems may be networked with integrated measurement or metrology tools employed by the active fabrication process in order to improve the active fabrication process, such as setup information generation, defect classification, data acquisition, rendering of data to a user, cross-calibration of measurement instruments, and the like.

The setup information generation systems comprise an off-line measurement instrument to measure a wafer, and a setup information generator to generate models and/or recipes according to the wafer measurement. The setup information generation system then provides the setup information to an active process measurement system, such as an integrated measurement tool or instrument, for use in measuring production wafers in a semiconductor manufacturing process.

According to an aspect of the present invention, a system is provided for creating setup information for use in measuring process parameters associated with semiconductor wafers in a semiconductor device manufacturing process, which comprises an off-line measurement instrument adapted to measure a wafer and a setup information generator. The setup information generator is operatively connected to the off-line measurement instrument to create setup information according to a measurement therefrom. The setup information is then provided to a process measurement system associated with the semiconductor device manufacturing process. The setup information can include recipes and/or models usable by the active process measurement system to measure process parameters associated with semiconductor wafers moving through the semiconductor device manufacturing process.

As used in the present invention, a recipe is a set of instructions for a measurement instrument comprising where to measure on the wafer, measurement system parameters for the physical measurement, and specification of an algorithm or formula to convert the fundamental physical measurements into useful information. For example, for a reflectometer measurement instrument, the recipe may comprise information about the layout of the wafer including die size and location, which dies on the wafer to measure, one or more sites within the die at which to measure (e.g., one or more sites corresponding to structures in the die), pattern recognition parameters to identify and locate structures in the die, length of time to integrate over for measuring reflected intensities, wavelengths of light at which to report measured intensities, an algorithm or mathematical formula based on a model that comprises a stack of thin films at the measurement location, specification of which parameters are known and which are to be measured, and the like. Other information may also be included in the recipe, depending on the applicable measurement instrument and requirements of the user.

A model, according to the present invention, can be described as a physical structure (e.g., wafer or stack of film layers) having a set of boundaries or parameters associated therewith. For example, Model X1 involves a structure B with a first set of parameters (e.g., 20 variables), whereby Model X1 yields an optical response B1 which may define a particular point in data space. Model X2 involves the structure B but with a second set of parameters, which yield an optical response B2. The second set of parameters may include a variation of at least one of the 20 variables in the first set of parameters. A spectrum can be produced from each optical response, and the spectra taken from Models X1 to Xn can be stored in a library. Spectra may be derived from either real wafer samples or from theoretical calculations.

Another aspect of the invention provides a method of generating setup information for measurement of process parameters associated with an active process measurement system in a semiconductor device manufacturing process. This aspect of the invention comprises performing a measurement of a wafer using an off-line measurement instrument, generating setup information according to the measurement using a setup information generator, and providing the setup information from the setup information generator to the process measurement system using a network. The measurement can comprise measuring an optical constant associated with a layer on the wafer using a spectroscopic ellipsometer, and the setup information generation may comprise generating a signature matching model for use in association with an optical scatterometer employing the optical constant from the spectroscopic ellipsometer.

According to yet another aspect of the invention, a system is provided for generating a model for use in matching measured spectra from an optical scatterometer with performance parameters associated with a processed semiconductor wafer. The system comprises a spectroscopic ellipsometer (SE) operative to measure optical constants associated with unpatterned portions of wafers and to provide a file of information relating to film parameters and process parameters associated with the unpatterned wafers and calibration information associated with the SE. The system further comprises a model generator receiving the file from the SE and operative to generate a model usable by a process measurement system according to the file, film and process parameters, and metrology instrument parameters associated with the process measurement system. In addition, the system comprises means for transferring the model to the process measurement system, such as a network.

Another aspect of the invention provides a system for measuring process parameters associated with semiconductor products in a semiconductor manufacturing process. The system comprises a first measurement instrument integrated into a process tool in the manufacturing process and a stand-alone measurement system having a second measurement instrument similar to the first measurement instrument. The stand-alone measurement system is operative to perform at least one support service for the first measurement instrument using the second measurement instrument, such as generation of setup information (e.g., measurement recipes, models, or the like), defect classification, data acquisition, rendering data to a user, and cross-calibration. The system further comprises a network, such as a high-speed TCP/IP network, operatively interconnecting the first measurement instrument in the process tool with the stand-alone measurement system, whereby information and data may be transferred therebetween.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
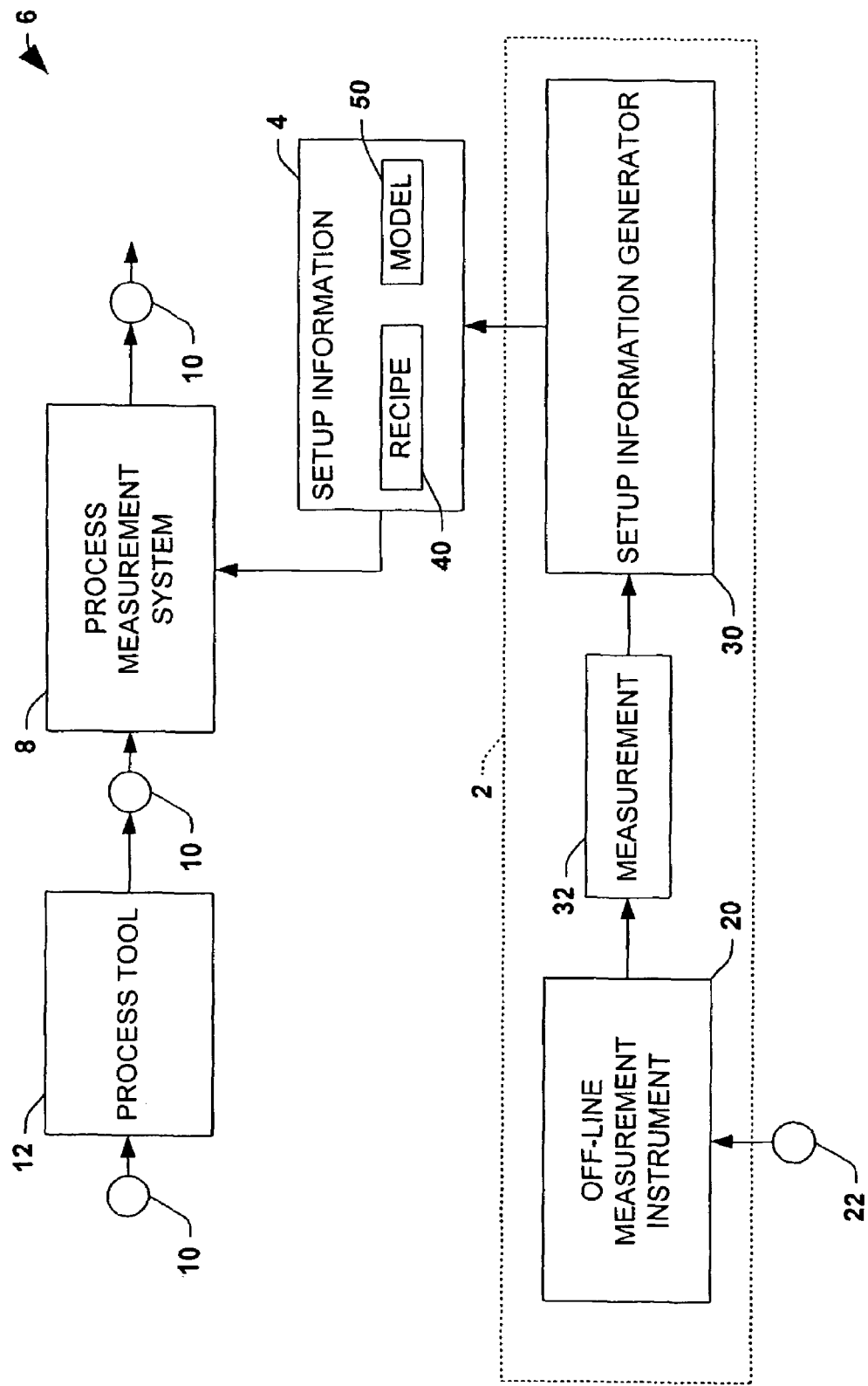
FIG. 1 is a schematic diagram illustrating an exemplary system for creating setup information in which one or more aspects of the present invention may be implemented.

The various aspects of the present invention will now be described with reference to the drawings, wherein like reference numerals are used to refer to like elements throughout. The invention provides systems and methods for generating setup information, such as models and/or recipes, for use measuring process parameters associated with semiconductor devices. In one aspect of the invention, models and/or recipes are generated in a stand-alone measurement system networked to one or more in-process measurement systems. The stand-alone system may thus be used to perform setup type operations (e.g., model and/or recipe generation) in off-line fashion for subsequent downloading of such setup information to in-line process measurement systems. The invention may thus reduce or mitigate down-time associated with such setup operations.

Referring initially to FIG. 1, an exemplary system 2 is illustrated for creating setup information 4 in association with a semiconductor device manufacturing process 6, in which one or more aspects of the present invention may be implemented. The setup information 4 can be distributed to and employed by an active process measurement system 8 in measuring process parameters (e.g., CDs, profiles, overlay registration, and other process parameters) associated with semiconductor wafers 10 being processed by an integrated process tool 12 (e.g., lithography station or other process tool) in the manufacturing process 6. The system 2 comprises an off-line measurement instrument 20, such as a spectroscopic ellipsometer (SE), scanning electron microscope (SEM), atomic force microscope (AFM), scatterometer, or other type of measurement instrument, which is adapted to measure a wafer 22. For instance, the instrument 20 may be an ellipsometer operative to measure optical constants such as n and k values associated with unpatterned portions of the wafer 22. The system 2 further comprises a setup information generator 30 operatively associated with the instrument 20 to create the setup information 4 according to a measurement 32 therefrom, and to provide the setup information 4 to the active process measurement system 8.

The setup information 4 can include any type of setup information usable by the active process measurement system 8, such as for example, a recipe 40 and/or a model 50. For instance, the model 50 may refer to a plurality of models (e.g., one or more models) such as Models X1 to Xn. Each Model X1 to Xn has the same physical structure but each has a different set of parameters associated therewith. The parameters may include one or more variables and each set of parameters may vary by as few as one variable. A calculated spectrum can be generated from each model which corresponds to a light-scattering pattern relating to the physical structure of the model and its given a set of parameters.

The calculated spectra derived from Models X1 to Xn may also be referred to as calculated or theoretical signatures and stored in a signature library (e.g., intensity/phase signatures). The active process measurement system 8 compares a spectrum of a sample or unknown wafer 10, which can be generated by a scatterometer, with signature library to find the closest match. This may be referred to as signature matching. Once the closest match is selected, the data associated with the closest match (e.g., stored signature of Model X5) is analyzed in order to "see" what structure was just measured. Additional models can then be generated by adjusting the parameters of Model X5 in order to obtain an even closer match. The measurement system 8 may make a determination concerning the properties of the surface of the wafer 10, such as the size, roughness, planarity, or spacing of features (e.g., lines) patterned thereon by the integrated process tool 12. Thus, for example, measured signatures produced by light reflected from and/or refracted by different surfaces in the wafers 10 which are due, at least in part, to the complex index of refraction of the surface thereof, may be compared with theoretical signatures derived from the model 50, whereby a process parameter (e.g., CD, profile, overlay registration, or other parameter) may be ascertained by the measurement system 8, for example, using signature matching or other type of correlation technique. In this regard, the measurement 32 from the off-line instrument 20 can include the index of refraction (n) of the surface of the unpatterned wafer 22, as well as an extinction coefficient (k).

The signature library can also be constructed in the setup information generator 30 from measured signatures of real samples such as the unpatterned wafer 22 and/or from calculated signatures generated by modeling and simulation. Measured signatures can be combined with calculated signatures to form the signature library. Thus, simulation and modeling can be employed to produce signatures in the model 50 against which measured signatures can be matched in the process measurement system 8. It will be appreciated in this regard, that such simulation, modeling and/or measured signatures can be stored in a library (not shown) in the measurement system 8, wherein the library can include many such measured and/or calculated signatures of known and unknown real samples. Thus, when the phase/intensity signals are received from scatterometry-detecting components in the system 8, these can be compared to or otherwise correlated with the closest matching signature stored in the library.

In addition, the setup information may be transferred by any means, such as wherein the setup information generator 30 comprises a network interface (not shown) operative to transfer the setup information 4 to the process measurement system 8 via a network or bus configuration to facilitate immediate sharing of information between the various off-line and active measurement systems, instruments, and process tools, as illustrated and described in greater detail hereinafter. The system 2, thus allows for off-line setup operations to be performed thereon, while the active process measurement system 8 may continue to actively measure wafers 10 with the integrated process tool 12. In this manner, the invention may be advantageously employed to mitigate down-time associated with conventional setup information creation techniques.

Figure 2:
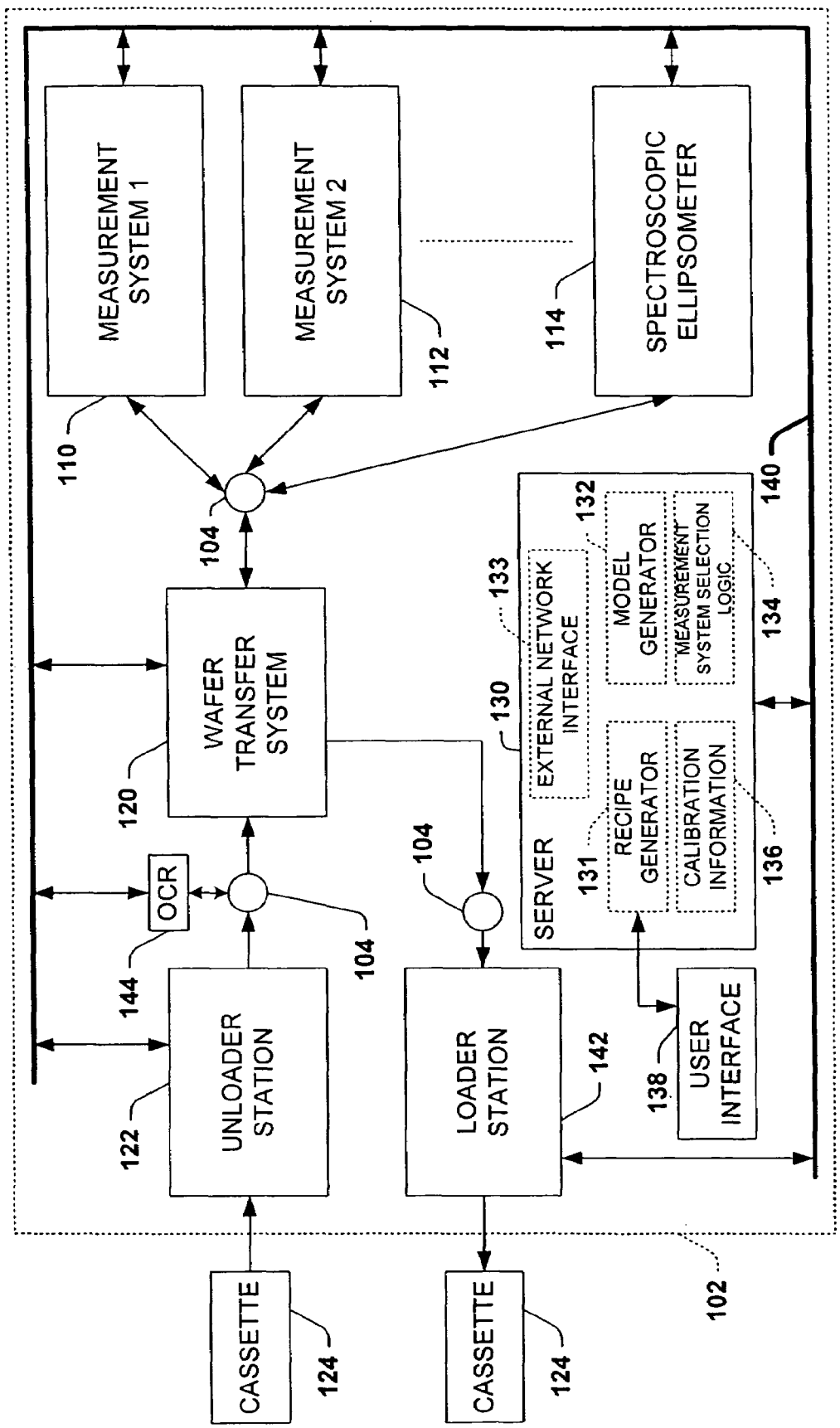
FIG. 2 is a schematic diagram illustrating an exemplary stand-alone system for generating setup information in accordance with the invention.

According to another aspect of the invention, a setup information creation system may be implemented as a stand-alone automated system or cluster 102 as illustrated in FIG. 2, comprising a cluster of measurement instruments or systems 110, 112, and 114 for measuring wafers 4. The cluster 102 may be advantageously employed for measuring process parameters (e.g., overlay registration, photoresist layer defects, feature sizes, spacing between features, particle defects, chemical defects, film or layer roughness, and the like) associated with wafers 104 in a semiconductor fabrication process, as well as for generation of setup information for transferring to other measurement systems or measurement system clusters. The cluster 102 comprises a plurality of measurement systems 110, 112, and 114 having measurement instruments (not shown) associated therewith. For example, the systems 110 and 112 can include scanning electron microscopes (SEMs), atomic force microscopes (AFMs), scatterometers, or other measurement instruments adapted to measure process parameters associated with processed semiconductor wafers 104, and the measurement system 114 is a spectroscopic ellipsometer (SE) in the exemplary cluster 102.

The exemplary cluster 102 further comprises a wafer transfer system 120, such as a robot or other automated wafer translation apparatus, which receives wafers 104 via an unloader station 122 which unloads wafers 104 from a cassette 124 or other wafer carrying device. Alternatively or in combination, wafers 104 can be provided to the wafer transfer system 120 (e.g., or individually to the measurement systems 110, 112, and/or 114) manually. The wafer transfer system 120 operates to selectively provide wafers 104 to one or more of the measurement systems 110, 112, and/or 114 according to a measurement system selection criteria, such as wafer measurement throughput, measurement system accuracy capabilities,,measurement system availability, or other factors. One or more process parameters (e.g., CDs, profiles, overlay registration, or the like) are then measured and/or inspected in order to verify proper processing of the wafers and/or to detect defects or errors in the fabrication process. Furthermore, the measurement(s) from one or more of the measurement systems 110, 112, and/or 114 may be employed in order to generate setup information (e.g., recipes and/or models) for use in the cluster 102 or for provision to other measurement systems.

The exemplary cluster system 102 further comprises a server 130 having a recipe generator 131, a model generator 132, an external network interface 133 for transferring setup information (e.g., from the recipe generator 131 and/or the model generator 132) to other measurement systems or instruments via an external network (not shown), a measurement system selection logic 134, and calibration information 136 therein, as well as a user interface 138. The user interface 138 may be used to obtain user information in generating recipes for measurement of process parameters in a process measurement system, as well as for rendering measurement data, statistics, or other report information from the cluster 102 to a user. For example, the server 130 may gather measurement data from the measurement systems 110, 112, and/or 114, as well as from other networked measurement systems or instruments (e.g., via the external network interface 133), which may then be formatted and presented to a user via the interface 138. The measurement systems 110, 112, and 114, as well as the unloader station 122, the wafer transfer system 120, and the server 130 are networked together via a network 140 internal to the cluster 102, whereby measurement information, measurement system selection information, calibration information 136, and other control information and data may be shared between the various components of the measurement system cluster 102.

Once the appropriate process parameters associated with the wafers 104 have been measured via the measurement systems 110, 112, and/or 114, the wafer transfer system 120 provides the wafers 104 to a loader station 142 which loads the wafers into outgoing wafer cassettes 124 for transfer to other systems in the fabrication process, such as a downstream process tool (not shown). One skilled in the art will recognize that the loader and unloader stations may be physically the same device, and that the incoming and outgoing cassettes may be the same. The cluster 102 preferably further comprises an optical character recognition (OCR) system 144 providing a wafer identification (not shown) to the measurement system selection logic component 134 via the network 140, whereby the component 134 may make an appropriate selection of measurement system(s) 110, 112, and/or 114 to be used to measure or inspect the wafer 104. Although the exemplary cluster 102 identifies the wafers 104 using the OCR system 144, other techniques may be used to identify the wafers 104, such as for example, location within the cassette 124, or other methods as are known. It will be appreciated, however, that where lot code information, date codes, and the like are printed or stamped directly on the wafers 104, the OCR system 144 can advantageously reduce the likelihood of incorrect wafer identification.

The measurement system selection logic component 134 in the server 130 provides a measurement system selection to the wafer transfer system 120 according to one or more selection criteria, wherein the wafer transfer system 120 provides the wafers 104 to at least one of the measurement systems 110, 112, and/or 114 according to the measurement system selection. For example, the measurement system selection criteria can include capabilities requirements information associated with the wafer 104, as well as capability information, availability information, and throughput information associated with the measurement systems 110, 112, and 114. The selection moreover, may be made according to a desired sequencing of measurements in the systems 110, 112, and/or 114, for example, where the spectroscopic ellipsometer 114 is employed to measure optical constants or the like associated with an unpatterned wafer 104, which constants are then provided to the model generator 132 in the server 130 via the internal network 140, in order to generate a model.

The capabilities information may thus be derived according to the wafer identification from the OCR system 144, and may comprise information indicating the type of feature(s) or dimension(s) to be measured in the system 102, as well as the required accuracy for the measurement(s). The measurement system selection from the logic component 134 may further take into account the measurement capabilities of the various measurement systems 110, 112, and/or 114. For example, one or more of the systems 110, 112, and/or 114 may be capable of performing a given measurement within the required accuracy, while others may not. In addition, the respective systems 110, 112, and/or 114 can each have different throughput capabilities. For instance, a SEM instrument may be able to measure 130 wafers per hour (wph), a scatterometer may measure up to 150 wph, and a spectroscopic ellipsometer may measure 75 to 80 wph. In selecting a measurement system to perform a given measurement task, therefore, the measurement system selection logic component 134 may advantageously select the system which can provide the highest throughput, within the required measurement capabilities for the measurement.

In this regard, the selection logic component 134 may also consider which systems 110, 112, and/or 114 are currently available in scheduling the, transfer of wafers 104 via the transfer system 120. Thus, the measurement system selection logic component 34 provides the selection indicating a selected measurement system 110, 112, or 114 having capabilities required for the wafer 104 according to the capabilities requirements information (e.g., obtained or derived from the wafer identification via the OCR system 144) and the measurement system capability information. Furthermore, the selection may reflect the measurement system having the highest throughput with the capabilities required for the wafer 104 according to the measurement system availability information and the throughput information.

As the various measurement systems 110, 112, and 114 are interconnected in the cluster 102, and may share information via the network 140, the systems 110, 112, and/or 114 may be cross-calibrated. In this regard, the calibration information 136 in the server 130 may be shared between the various systems 110, 112, and 114, whereby the measurements made by one measurement instrument in the systems 110, 112, or 114, are comparable to those made by another such instrument. In addition, such calibration may be provided to other measurement systems via the external network interface 133, for example, whereby cross-calibration may be achieved between measurement instruments 110, 112, 114, and other measurement systems outside the cluster system 102. The exemplary cluster system 102 thus provides significant advantages over conventional stand-alone measurement systems with respect to cross-calibration as well as in reducing excess transferring of the wafers 104 between such stand-alone measurement stations in a fabrication process.

Information may be provided to an upstream (e.g., or downstream) process tool (e.g., photo-resist track, stepper, or the like), which can employ such information as process feedback, whereby on-line closed-loop process control can be achieved, for example, wherein the process tool performs fabrication processing steps according to the measurement data in order to mitigate defects in processed wafers 104. Alternatively or in combination, the measurement (e.g., and/or defect detection) information may be provided to an advanced process control (APC) system (not shown), which in turn may provide process adjustments to such process tools in feedback and/or feed forward fashion. In this regard, it will be appreciated that the reduction in transfer time resulting from clustering of multiple measurement systems 110, 112, and 114 into a single system 102, as well as the selective employment of appropriate measurement systems based at least in part on throughput and/or availability information, may be used to mitigate down-time of related process tools, whereby real-time or near real-time measurement and/or defect detection may be achieved with little or no fabrication process down-time, in accordance with the present invention. Moreover, the exemplary measurement cluster 102 may also be integrated with a process tool, as illustrated further hereinafter, which operates to perform one or more fabrication processing steps on the wafers 104 and to provide the processed wafers 104 to the wafer transfer system 120.

Figure 3:
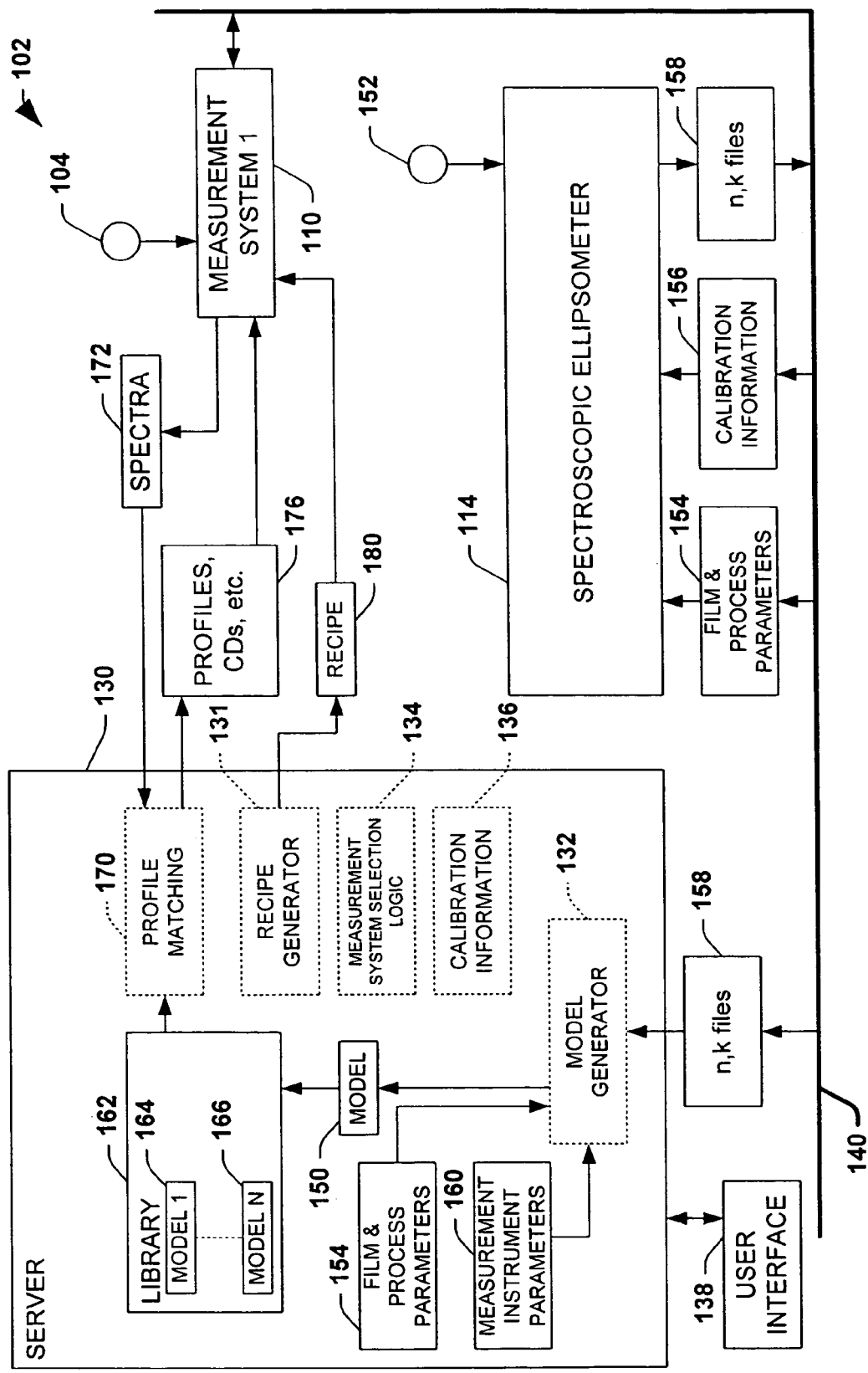
FIG. 3 is a schematic diagram further illustrating the system of FIG. 2.

Referring also to FIG. 3, further details of the exemplary system 102 are illustrated, wherein the system 102 may be advantageously employed to perform model generation to create one or more models Z1 to Zn 150 using the model generator 132. An unpatterned wafer 152 is provided to the SE 114 (e.g., manually or via wafer transfer system 120), together with film and process parameters 154 associated with the processing of the wafer 152, and calibration information 156 from the server 130. The. ellipsometer 114 is then employed to measure the wafer 152 for providing n, k files 158 to the server 130 via the internal network 140, for example, including the refractive index n and extinction coefficient k. The files 158 are then provided to the model generator 132 along with film and process parameters 154 and measurement instrument parameters 160, which the model generator 132 uses to generate the model 150. The model 150, in turn, may be stored in a library 162 having N such models 164 through 166. A signature matching component 170 in the server 130 thereafter may receive a measured spectrum 172 (or spectra) associated with a measured wafer 104 from a measurement system 110 (e.g., wherein system 110 can include a scatterometer), wherein the component 170 compares or correlates the measured spectra 172 to determine a performance parameter 176 (e.g., profiles, CDs, or the like) associated with the wafer 104.

The cluster system 102 may alternatively or in combination be used to generate a recipe 180 via the recipe generator 131, for use in making wafer measurements using the measurement system 110. For instance, a user may train the system 102 via the user interface 138 for pattern recognition, selection of wafer sites to be measured, entry of acceptance limits, setting of alarm conditions, setting control limits for measured data, formatting for displaying or reporting measured data and/or statistics, destination to which measured data is to be sent, and the like. This recipe 180 may thereafter be used in measuring one or more wafers 104 using measurement systems 110, 112, and/or 114 in the cluster 102, and/or may be transferred to other measurement systems via the external network interface 133 (e.g., FIG. 2). The exemplary measurement system cluster 102 may thus provide significant advantages in performing setup operations such as model and/or recipe creation, wherein the setup tasks may be done in an off-line fashion while process measurement systems are used for measuring production wafers, thereby mitigating down-time associated with prior setup information generation techniques.

Figure 4:
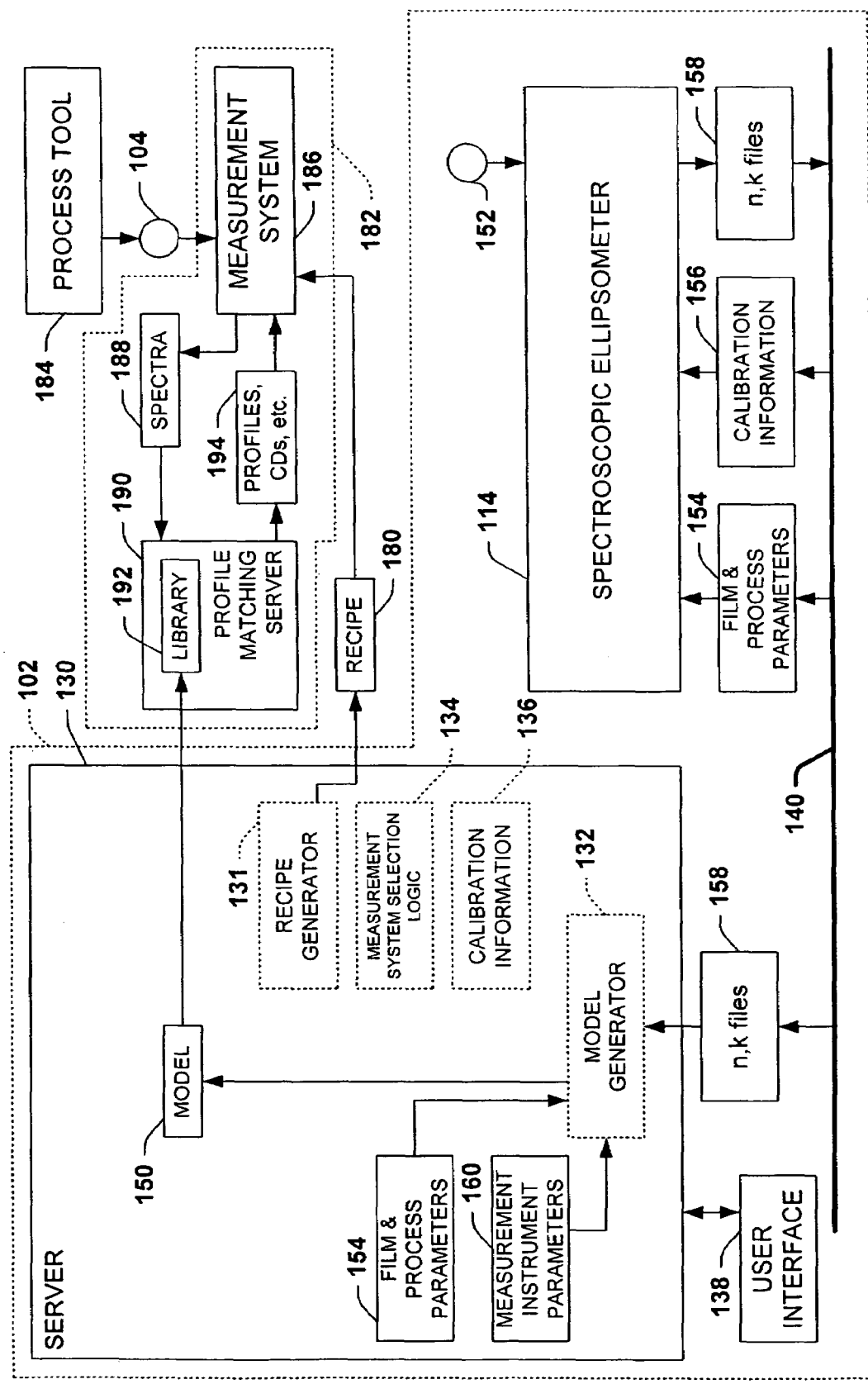
FIG. 4 is a schematic diagram illustrating the stand-alone system of FIGS. 2 and 3 providing setup information to a process measurement system in accordance with another aspect of the invention.

Referring now to FIG. 4, the stand-alone system 102 can be used to provide setup information, such as recipe 180 and/or model Z1 to Zn 150, to a separate and possibly remote process measurement system 182 receiving wafers 104 from a process tool 184 (e.g., lithography station or other process tool related to semiconductor device fabrication) in accordance with another aspect of the invention. The systems 102 and 182 may be operative to communicate with one another via a network (not shown) as illustrated and described in greater detail hereinafter, such as a high-speed TCP/IP network. The process measurement system 182, moreover, can be of any type, including but not limited to another stand-alone cluster, an integrated metrology system within a process tool and having one or more measurement instruments or systems therein, or other apparatus operative to measure one or more process parameters associated with semiconductor wafers.

The process measurement system 182 comprises one or more measurement systems 186, such as a scatterometer providing measured spectra 188 to a signature matching server 190 with a library 192 of models. The signature matching server 190 in the process measurement system 182 correlates the measured spectra with the models in the library 192 in order to determine one or more process parameters 194, such as profiles, CDs, overlay registration, or the like. The setup information generation system 102 may advantageously create one or more models 150 for transfer to the process measurement system 182, whereby the model 150 may be added to the library 192 in the signature matching server 190, where it will be available for use in the process measurement system 182 as the need arises in the course of processing of wafers 104 using the process tool 184. Alternatively or in combination, the setup information generation system 102 may be used to generate a measurement recipe 180, which may also be provided to the measurement system 186 in the process measurement system 182. Such recipes 180 and/or models 150 can also be replicated from a database (not shown) in the server 130 to any number of networked process measurement systems or instruments, whereby the stand-alone system 102 may operate as a centralized data store for such setup information.

The database may also contain information to facilitate conversion of the measured information collected by an instrument into useable information about the process state of the wafer 104. For example, partial results of lengthy mathematical calculations and algorithms may be stored in a database for later, accelerated use. Measurement systems and metrology clusters described throughout FIGS. 1-4 above and FIGS. 5-11 below can generate databases to facilitate the determination and identification of wafer structures in accordance with the present invention. For further description of the database approach, pending U.S. application Ser. No. 09/927,177 (Publication No. 2002/0038196 A1) entitled "Database Interpolation Method For Optical Measurement of Diffractive Microstructures" is hereby incorporated by reference.

Figure 5:
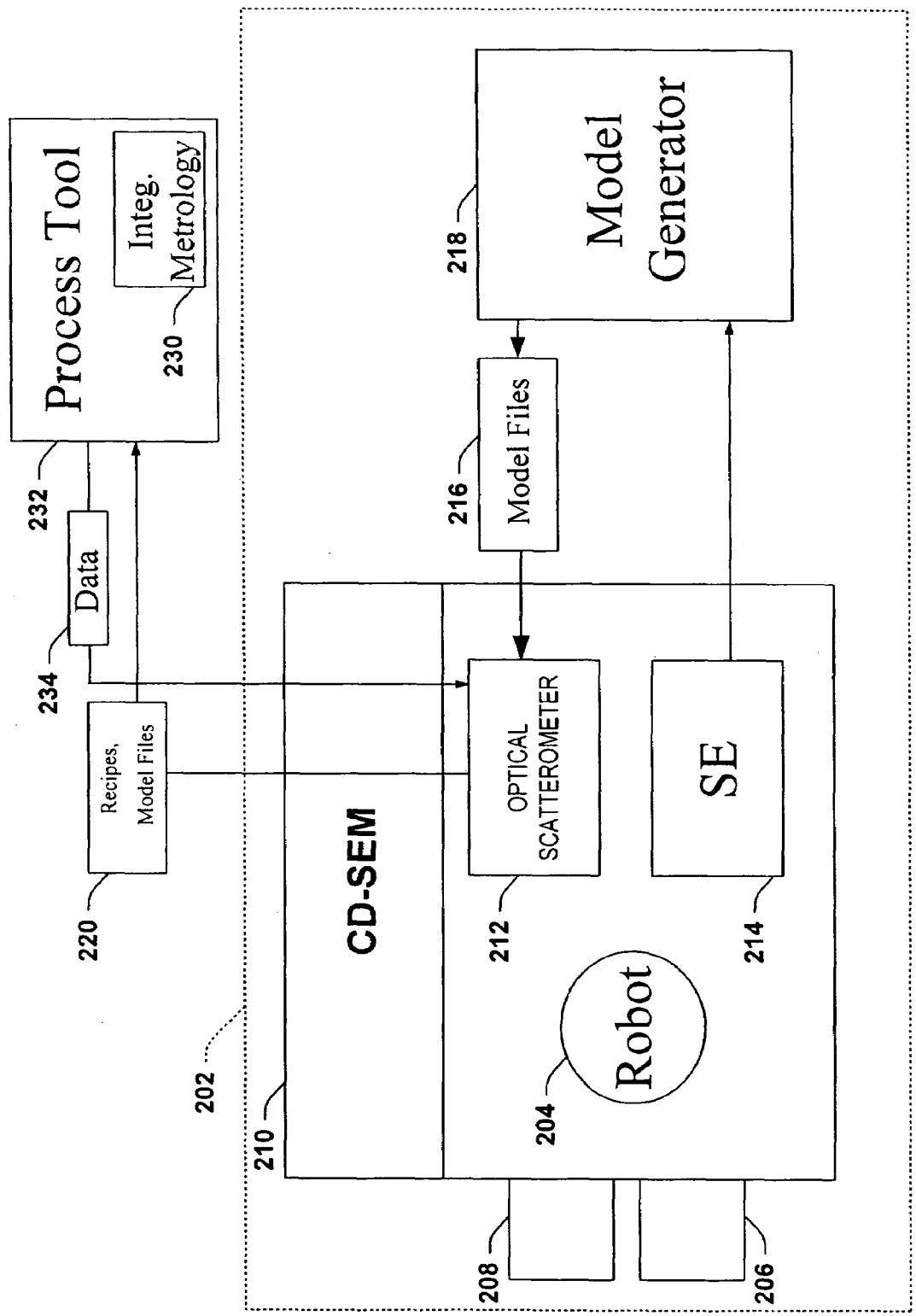
FIG. 5 is a schematic diagram illustrating another exemplary stand-alone system providing setup information to an integrated metrology system in a process tool.

Referring now to FIG. 5, another exemplary system 202 is illustrated for creating setup information in accordance with the invention. As with the exemplary system 102 of FIGS. 2-4, the system 202 comprises a plurality of measurement instruments clustered together, with a robot 204 to transfer wafers (not shown) between one or more of the instruments and loading and/or unloading stations 206 and 208, respectively. The system comprises a scanning electron microscope (CD-SEM) 210, an optical scatterometer 212, and a spectroscopic ellipsometer (SE) 214 located so as to allow transfer of wafers thereto from the robot 204. It should be appreciated that optical scatterometer 212 may comprise spectroscopic ellipsometer 214. In addition, the optical scatterometer 212 may also comprise a reflectometer (not shown).

The system 202 also comprises a model generator 218 and can be operated in similar fashion to the system 102 with respect to generating models 216. For instance, the SE 214 may be employed to measure an unpatterned wafer (not shown), and may provide one or more optical constants (e.g., n, k files) to the model generator 218, which in turn provides one or more model files 216 to the scatterometer 212. The scatterometer 212 includes a signature matching system (not shown), which may be used to match measured spectra from production wafers (not shown) with theoretical signatures from the model files 216 in order to measure and/or determine one or more process parameters associated therewith. Alternatively or in combination, the model files 216 may be provided to an integrated metrology system 230 in a process tool 232 in accordance with another aspect of the invention.

The system 202 may also be used to generate measurement recipes for use in association with one or more of the measurement instruments 210, 212, and/or 214 therein. Such recipes and model files 220 can furthermore be transferred to a process measurement system, such as the integrated metrology system 230 in the process tool 232. The cluster system 202 may also be provided with data 234, such as measurement data, statistics, etc., from the process tool 232 and/or from the integrated metrology system 230 therein, whereby a user (not shown) may access such data (e.g., together with data from other networked process measurement systems associated with the system 202) from a centralized location at the cluster 202, without having to visit each such process measurement system individually. In this regard, the system 202 may comprise a user interface (not shown) allowing the user to interface therewith for obtaining such data, generating measurement recipes, and other operations. It will further be appreciated in this regard, that the provision of the system 202 allowing such access to the associated process measurements (e.g., from the integrated metrology system 230) may advantageously eliminate the need for such user interfaces at the process measurement systems.

Figure 6:
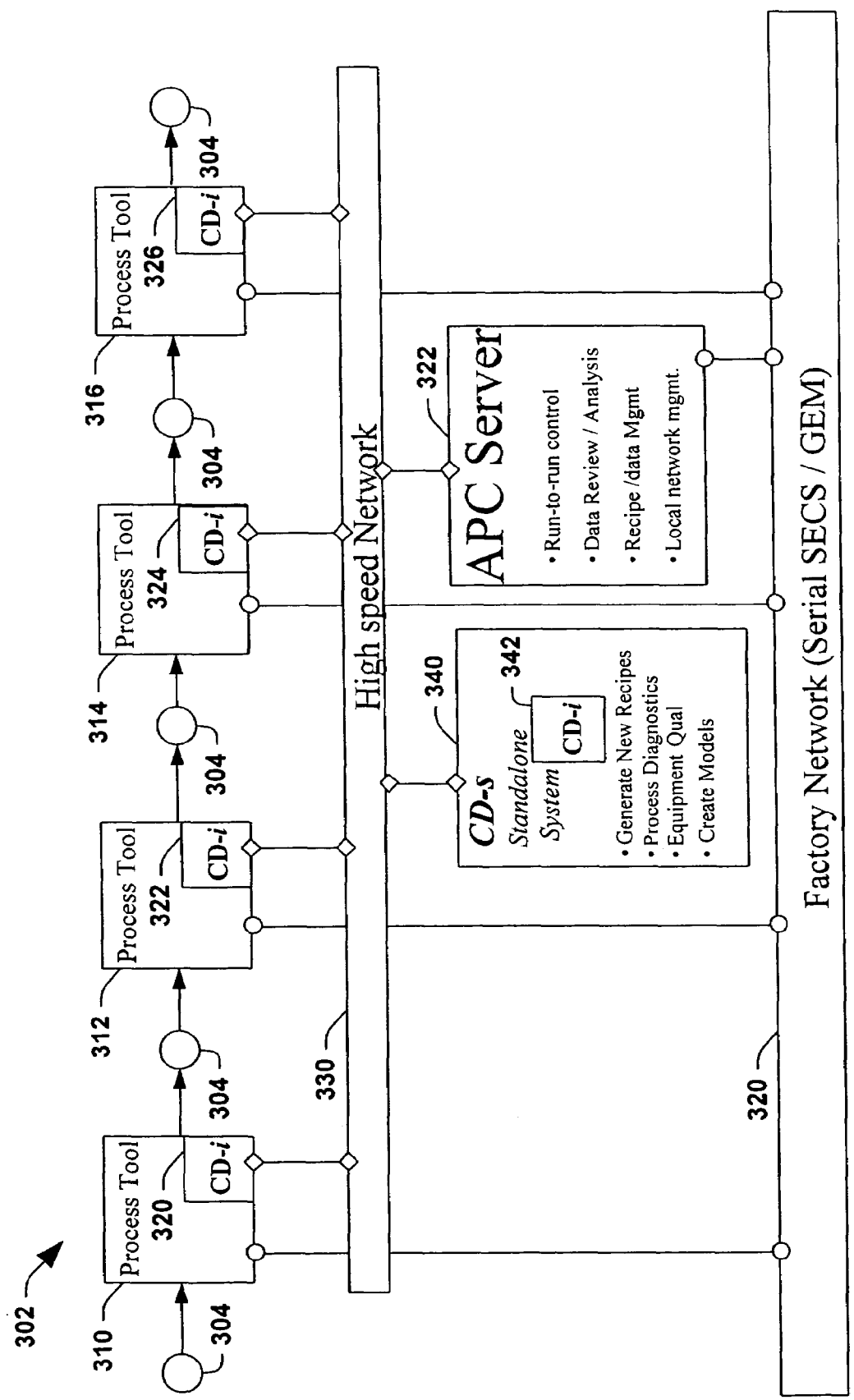
FIG. 6 is a schematic diagram illustrating a stand-alone system for creating setup information networked with several integrated metrology systems and an APC server via a high speed network in a semiconductor device manufacturing process.

Referring now to FIG. 6, a portion of an exemplary semiconductor device manufacturing process 302 is illustrated, wherein semiconductor wafers 304 are successively processed by process tools 310, 312, 314, and 316. The process tools 310, 312, 314, and 316 have integrated measurement or metrology systems or instruments 320, 322, 324, and 326 integrated therein, respectively, for measuring one or more process parameters associated with the wafers 304, such as CDs, overlay registration, profiles, or the like, in order to ascertain the quality of the wafers 304, the accuracy of the process tools 310, 312, 314, and/or 316, or otherwise to verify proper processing of the wafers 304 in the process 302. The process tools 310, 312, 314, and 316 are connected to a factory network 320 for communication with each other as well as with an advanced process control (APC) server 322, which can provide control of the tools 310, 312, 314, and/or 316, data acquisition therefrom, data review and analysis functions, network management functions, as well as providing a data store for various processing recipes used by the tools 310, 312, 314, and/or 316.

The integrated measurement systems 320, 322, 324, and 326 are networked together via a high-speed network, such as a TCP/IP network 330 in order to communicate with each other and with a stand-alone measurement system 340 having one or more measurement systems 342 integrated therein. The standalone system 340 is operable to generate (e.g., and/or edit) measurement recipes usable by the process measurement systems 320, 322, 324, and 326, as well as to create models for use by the measurement systems in the process 302, in a manner similar to the systems described above. In this regard, the system 340 includes measurement instruments 342 of the same or similar type as those for which the system 340 provides such support services. Thus, where the integrated measurement systems 320, 322, 324, and 326 each comprise a CD-SEM and a scatterometer, the stand-alone system 340 also includes a CD-SEM and a scatterometer, thereby allowing the stand-alone system 340 to be used for off-line generation or creation of setup information (e.g., recipes and/or models) for use in the integrated measurement systems 320, 322, 324, and/or 326.

In addition, the stand-alone system 340 may be adapted to provide diagnostics services to the process 302, for example, wherein measurement data from one or more of the measurement systems 320, 322, 324, and 326 are analyzed in order to identify process anomalies or defects in the wafers 304. Furthermore, the system 340 may include a data store for measurement recipes and models used by the measurement systems 320, 322, 324, and 326, as well as for calibration information (not shown) related thereto. Thus, the standalone system 340 provides for cross-calibration of the various measurement systems 320, 322, 324, and/or 326, as well as the measurement system 342 integrated therein.

Figure 7:
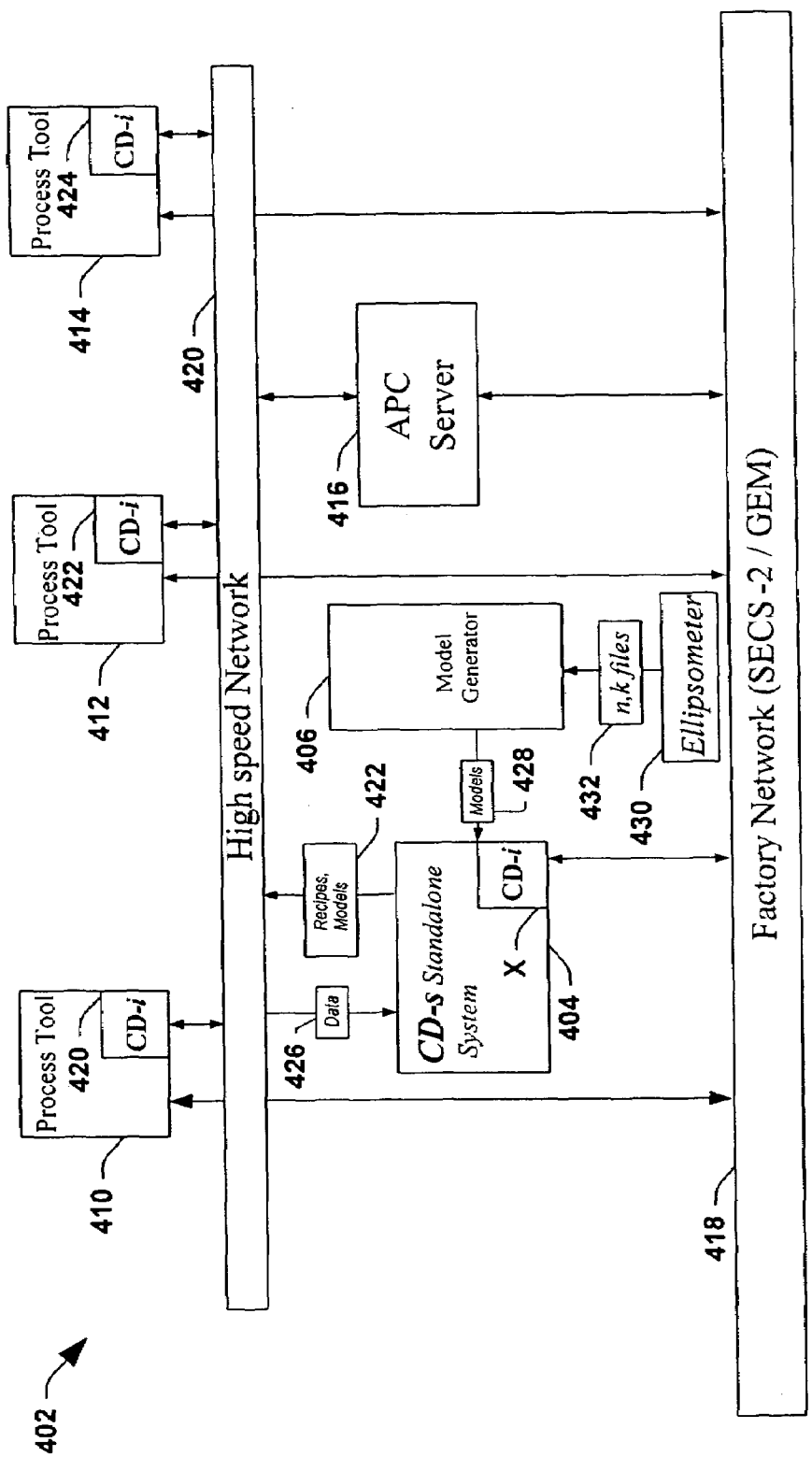
FIG. 7 is a schematic diagram illustrating a stand-alone metrology system receiving models from an associated local model generator in accordance with another aspect of the invention.

Referring now to FIG. 7, another implementation of the invention comprises a stand-alone metrology system 404 receiving models from an on-site local model generator 406 associated therewith in a semiconductor device manufacturing process 402. The process 402 comprises process tools 410, 412, and 414 networked to each other as well as to an APC server 416 via a factory network 418. The process tools comprise integrated measurement systems or instruments (e.g., which may be clusters of instruments) 420, 422, and 424, respectively, operative to measure process parameters associated with wafers (not shown) processed by the tools 410, 412, and/or 414 in a manner similar to the systems described hereinabove. The measurement systems 420, 422, and 424 are networked to each other as well as to the stand-alone system 404 via a high-speed network 420 for transfer of information therebetween. For instance, the network 420 advantageously provides for transfer of setup information (e.g., models and/or recipes) 422 from the stand-alone system 404 to one or more of the measurement systems 420, 422, and 424 in accordance with the present invention. In addition, data 426 may be transferred from one or more of the measurement systems 420, 422, and 424 to the stand-alone system 404 via the network 420.

The stand-alone system may be employed to generate models 428 using an associated model generator 406 and an ellipsometer 430 providing n,k files 432 thereto, and may but need not include an associated profile and/or signature matching server (not shown). The model generator 406 can include one or more servers or computer systems, which receive the n,k files 432 and generate the models 428 in accordance therewith, for example, wherein an unpatterned wafer (not shown) is measured using the ellipsometer 430 in order to produce the n,k files 432. Such models 428 and recipes 422 may then be uploaded to one or more process measurement systems 420, 422, and/or 424 via the network 420 for use thereby in order to measure one or more process parameters associated with wafers in the process 402.

Figure 8:
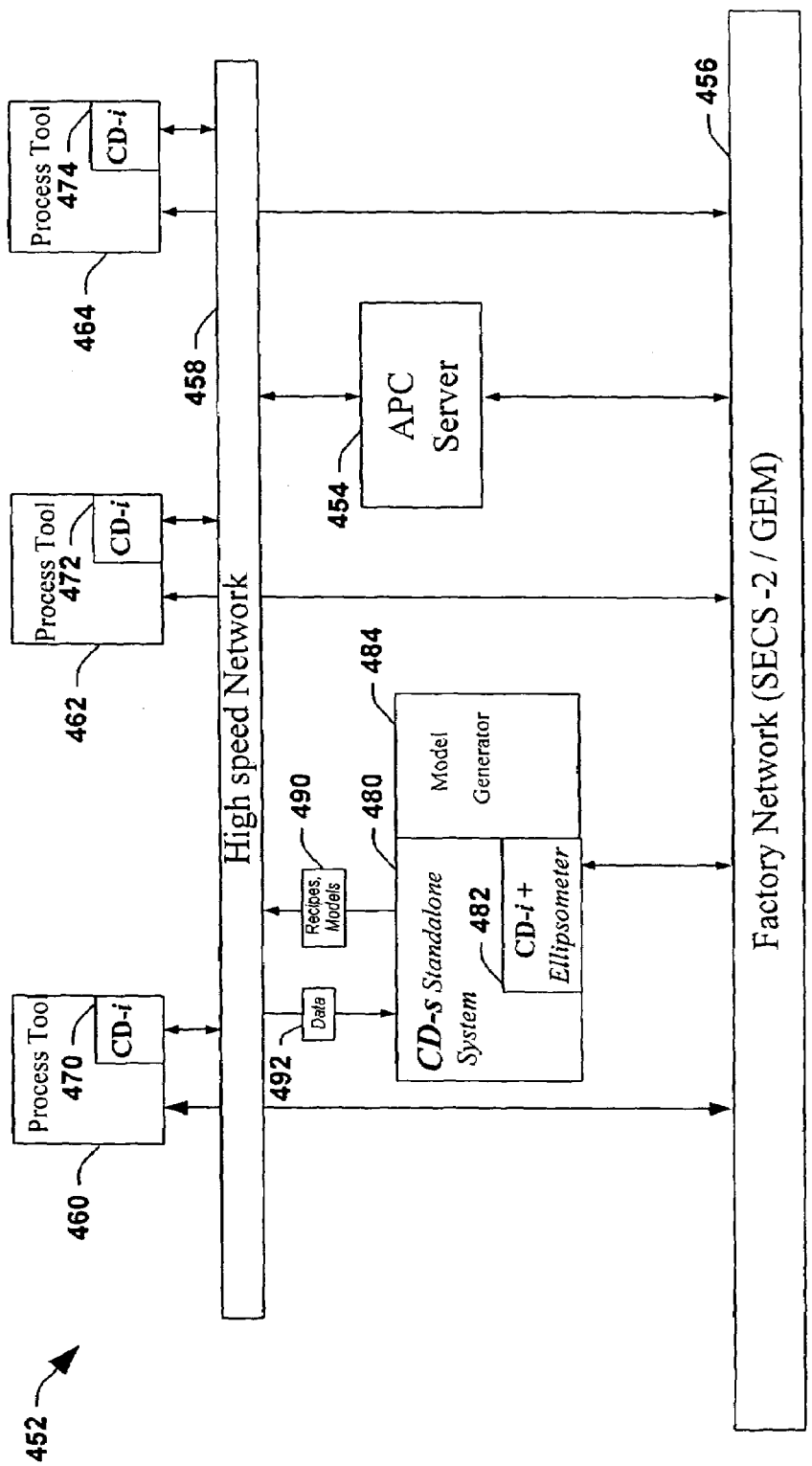
FIG. 8 is a schematic diagram illustrating an exemplary stand-alone metrology system with integral ellipsometer and model generator in accordance with the invention.

Another implementation of the present invention is illustrated in FIG. 8, wherein an exemplary semiconductor wafer fabrication process 452 comprises process tools 460, 462, and 464 networked together with an APC server 454 via a factory network 456, wherein the process tools 460, 462, and 464 respectively comprise integrated process measurement systems or tools 470, 472, and 474 networked via a high-speed network 458, wherein the APC server 454 can also interact with the network 458. A stand-alone measurement system 480 with interfaces to both networks 456 and 458 includes one or more integrated metrology or measurement systems or instruments 482 in similar fashion to the stand-alone system 102 illustrated and described above with respect to FIGS. 2-4, as well as an integrated model generator 484.

In addition to measurement systems or instruments of the same or similar type as the systems 470, 472, and 474 in the process tools 460, 462, and 464, respectively, the integrated measurement system 482 in the stand-alone system 480 comprises an ellipsometer adapted to measure unpatterned wafers (not shown) in order to provide optical constants (e.g., n,k files) to the model generator 484. Models and/or measurement recipes 490 may then be transferred to one or more of the integrated process measurement systems 470, 472, and/or 474 via the network 458, and data 492 may be obtained therefrom by the stand-alone system 480. Moreover, such measurement recipes, models, and other setup information may be replicated into a data store in the APC server 454 after receipt in the measurement systems 470, 472, and/or 474, where such replication may be performed via either of the networks 456 or 458.

Figure 9:
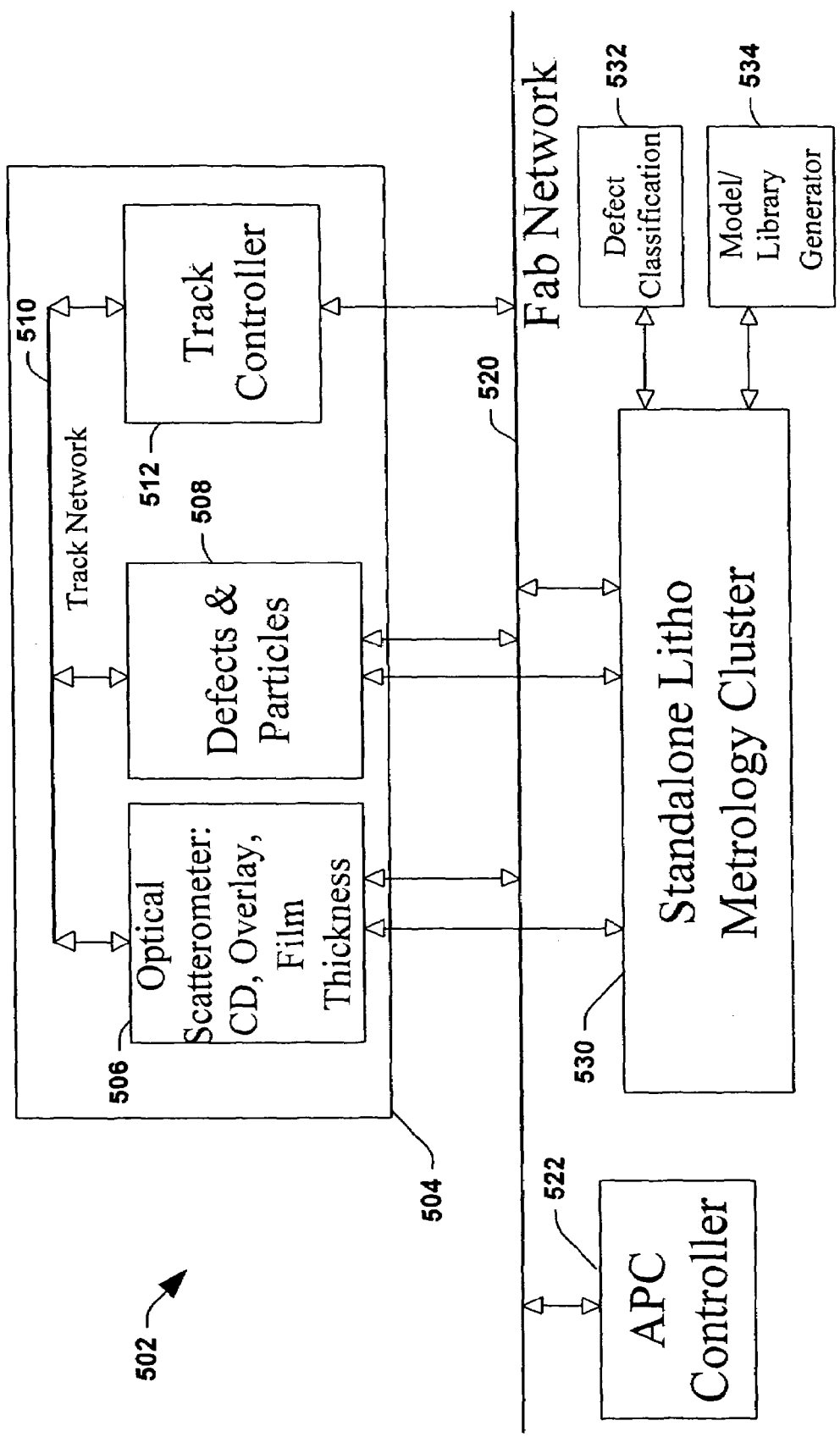
FIG. 9 is a schematic diagram illustrating a stand-alone metrology cluster with associated defect classification and model generation systems networked to an integrated metrology system in a lithography process tool in accordance with another aspect of the invention.

Referring now to FIG. 9, one or more aspects of the present invention may be applied to a lithography track type process tool 504 as part of a semiconductor device fabrication or manufacturing process 502. Although illustrated and described herein with respect to a lithography process tool, it will be appreciated that the invention finds application in association with any processing steps in such a manufacturing process, and that such applications are deemed to fall within the scope of the invention. The process tool 504 includes components (not shown) for performing one or more lithography steps to wafers in the process 502, as are known. In addition, the tool 504 comprises an integrated optical scatterometer measurement instrument 506 for measuring process parameters such as CDs, overlay registration, film thicknesses, profiles, or the like. The tool 504 further includes an inspection component 508, whereat wafers may be inspected for defects and particulate matter. The scatterometer 506 and the inspection component 508 are networked via a track network 510 together with a track controller 512, which provides for controlled operation of the tool 504.

The track controller 512, inspection component 508, and the scatterometer 506 are operatively connected with a fabrication network 520 along with an APC controller 522, which operates in similar fashion to the APC servers illustrated and described above. The measurement and inspection systems 506 and 508 are further networked with a stand-alone metrology cluster 530 having an associated defect classification system 532 and library or model generator system 534. The cluster 530 includes a scatterometer (not shown) similar or identical to the scatterometer 506 in the track tool 504, whereby the cluster may be used to create measurement recipes therefor while the scatterometer 506 is otherwise available for measuring wafers in the process 502, which recipes may then be transferred to the process scatterometer 506. Once received in the scatterometer 506, such recipes may then be replicated to a measurement recipe data store (not shown) in the APC controller 522.

The cluster 530 further comprises a spectroscopic ellipsometer (not shown) cooperating with the model generator 534, whereby models may be generated in the cluster 530 for uploading to and use by the process scatterometer 506. Data from one or both of the process scatterometer 506 and/or the inspection component 508 may be transferred to the cluster 530, for analysis, detection, and/or diagnosis of one or more defects using the defect classification system 532. It will be appreciated that the various functions described for the cluster 530, as well as the other setup information creation systems and devices herein may be implemented in software executing on a server or other computer system or groups of such systems, or may be implemented in hardware or combinations of hardware and software, within the scope of the present invention. In this regard, the defect classification systems 532 and/or the model generator system 534 may comprise software in a server in the cluster 530, or may reside in individual servers within the cluster 530, or in other such integrated or associated implementations.

Data from the integrated metrology tool 506 can be advantageously employed in a variety of ways in order to identify proper performance of the track process tool 504. For instance, critical dimension (CD) data that is collected by an integrated metrology system such as the scatterometer 506 in the track 504 can be analyzed with the data collected from a variety of other devices in order to deconvolve the various sources of CD uniformity. Such analysis may be performed in either of the stand-alone cluster 530 and/or the APC controller 522. As one example, the temperature uniformity of each bake plate (not shown) in the track 504 can be mapped using a sensor wafer such as those available from Sensarray or On Wafer Technologies. When the CD is mapped using an integrated CD tool such as scatterometer 506, this uniformity is a function of the bake-plate uniformity as well stepper dose uniformity and possibly resist thickness uniformity. The integrated measurement instrument 506 may be used to measure two of these three process parameters associated with a wafer, and the data analysis (e.g., in the cluster 530 and/or the APC controller 522) may comprise deducing the stepper dose uniformity from measurement data for the bake plate uniformity and resist thickness. Thus, data from the integrated metrology tool 506 can be used for advanced process control (APC) functions.

Figure 10:
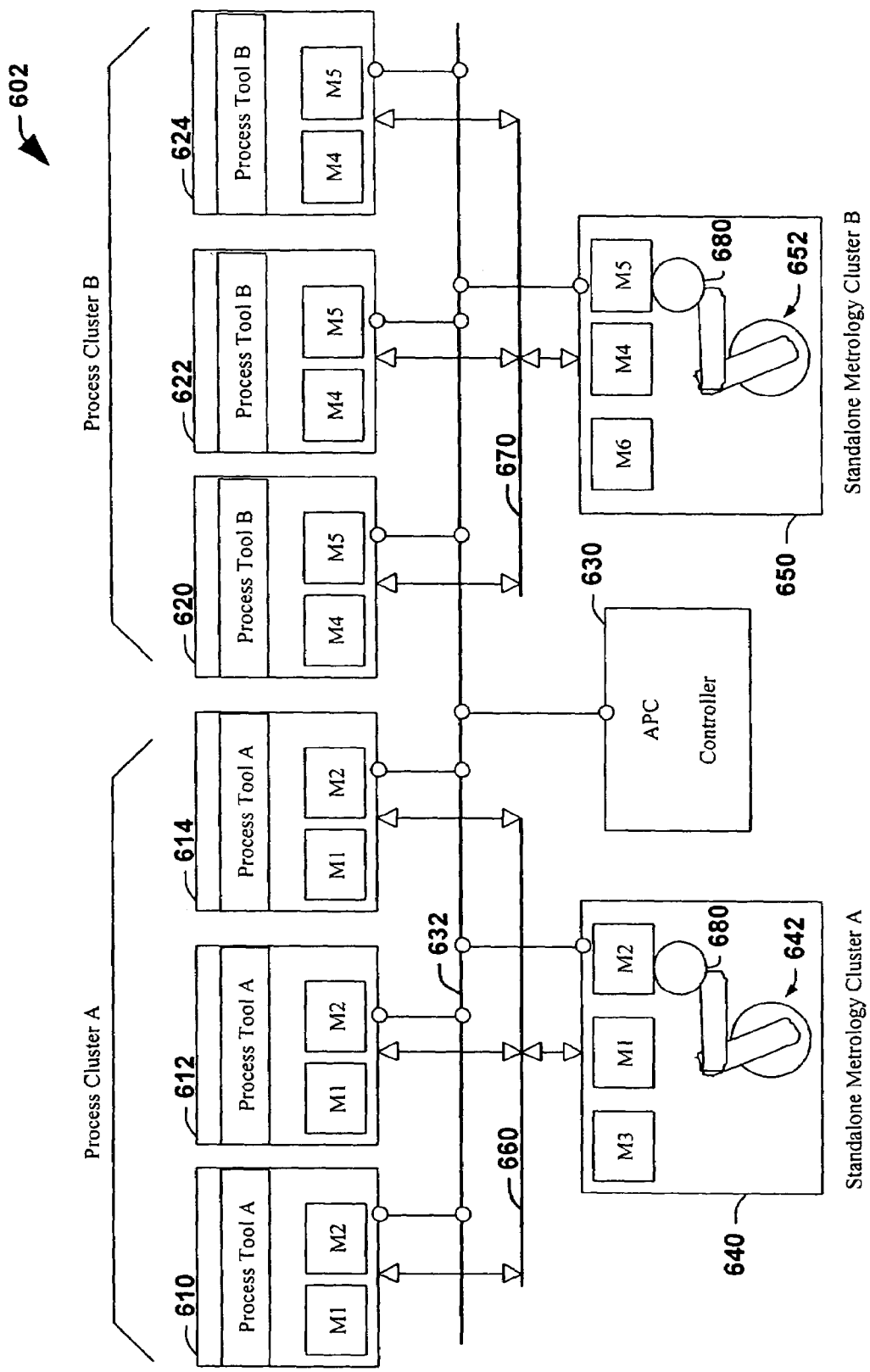
FIG. 10 is a schematic diagram illustrating a portion of a manufacturing process having two process clusters with integrated metrology systems in process tools, and having networked stand-alone metrology clusters servicing the integrated metrology systems within the process clusters.

Referring now to FIG. 10, another aspect of the present invention provides for integration of one or more measurement instruments or systems in a process tool, where the measurement system or systems are networked to a stand-alone measurement system with a similar or identical measurement instrument. The stand-alone measurement system can thus provide support services for the integrated instrument(s), such as generation of setup information (e.g., measurement recipes, models, or the like), defect classification, data acquisition and reporting for rendering to a user, cross-calibration, and the like. A semiconductor device manufacturing process 602 is illustrated in FIG. 10, having two process clusters, process cluster A and process cluster B, each process cluster having like process tools associated therewith.

Process cluster A comprises three process tools 610, 612, and 614 of type "A", for example, such as lithography tools. The type A tools 610, 612, and 614 in process cluster A each comprise integrated measurement instruments of types M1 and M2, for instance, wherein M1 may be a CD-SEM type measurement instrument, and M2 may be an optical scatterometer type. Many forms of measurement instrument integration are contemplated within the present invention, including but not limited to physical integration of such instruments within a process tool enclosure, attachment thereto, or other integration techniques. In addition to physical integration, the integrated measurement instruments or systems may be interconnected with such process tools so as to allow communication of information and/or data therebetween. The measurement instruments M1 and M2 integrated into the type A process tools 610, 612, and 614 are selected so as to accommodate measurements associated with the wafer processing performed by the type A process tools 610, 612, and 614.

Similarly, process cluster B comprises three process tools 620, 622, and 624 of type "B", each having process measurement instruments or systems of type M4 and M5 selected according to the processing performed by the type B tools 620, 622, and 624. For instance, the type B process tools 620, 622, and 624 may comprise etch tools. The integrated measurement instruments M1, M2, M4, and/or M5 may comprise individual measurement instruments, or alternatively may comprise clusters of similar or dissimilar measurement instruments within the scope of the present invention. The process tools 610, 612, 614, 620, 622, and 624 are operatively interconnected with each other and with an APC controller 630 via a factory network 632 for communication of information and/or data therebetween. For instance, the APC controller may provide control information, process recipes, calibration information, or the like to the tools 610, 612, 614, 620, 622, and 624, and may receive measurement information or other information therefrom.

Stand-alone measurement system or metrology clusters 640 and 650 are operatively associated with the integrated measurement instruments-of the process tools in process clusters A and B via local cluster networks 660 and 670, respectively, as well as via the factory network 632. The stand-alone cluster 640 comprises measurement instruments (e.g., or clusters) M1 and M2 which are of the same or similar type (e.g., CD-SEM and scatterometer, respectively) as the instruments M1, and M2 integrated with the process tools 610, 612, and 614 of process cluster A, such that the metrology cluster 640 may provide one or more support services to the integrated measurement instruments or systems within the process cluster A.

In addition, the stand-alone cluster 640 includes a measurement instrument of type M3, and a wafer transfer system or robot 642 operative to selectively provide wafers 680 to one or more of the instruments M1, M2, and/or M3 therein. For instance, the M3 instrument can be a spectroscopic ellipsometer operative to measure optical constants associated with the wafers 680, whereby a model generator (not shown) in the cluster 640 may create models for use in the scatterometers M1 of the process tools 610, 612, and/or 614 of the process cluster A, in a manner similar to that described above with respect to FIG. 3. Alternatively or in addition, the cluster 640 may perform other support services for the integrated metrology devices in the tools 610, 612, and/or 614, including but not limited to generation of other setup information (e.g., measurement recipe creation), defect classification, data acquisition, rendering data to a user, cross-calibration, or the like.

Similarly, a stand-alone measurement system cluster 650 is operatively associated with the measurement instruments M4 and M5 in the process tools 620, 622, and 624 of process cluster B via another local network 670, and well as via the factory network 632. The cluster B 650 comprises measurement instruments M4 and M5 of the same or similar type as the instruments M4 and M5 integrated in the process tools 620, 622, and 624, whereby support services may be provided to the integrated instruments using the stand-alone system 650, such as generation of setup information (e.g., model creation, measurement recipe creation, etc.), defect classification, data acquisition, rendering data to a user, cross-calibration, or the like. Also, the cluster system 650 comprises a robot 652 operational in a fashion similar to the robot 642 of cluster 640.

Figure 11:
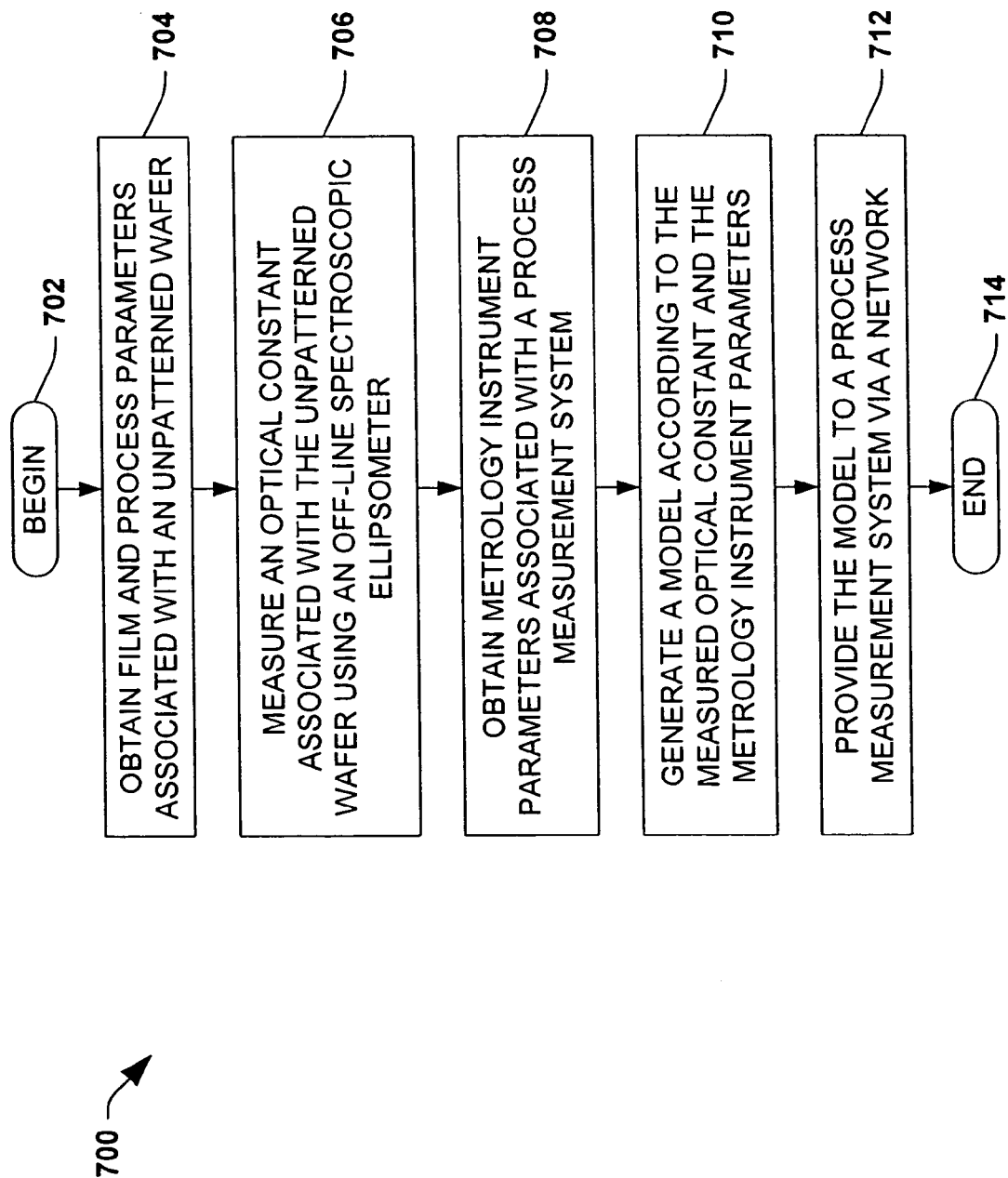
FIG. 11 is a flow diagram illustrating an exemplary method of generating setup information in accordance with another aspect of the invention.

Referring now to FIG. 11, another aspect of the invention provides methods for generating setup information for measurement of process parameters associated with a process measurement system in a semiconductor device manufacturing process. The invention comprises performing a measurement of a wafer using an off-line measurement instrument, generating setup information according to the measurement using a setup information generator, and providing the setup information from the setup information generator to the process measurement system using a network.

An exemplary method 700 is illustrated in accordance with the present invention beginning at 702. Although the exemplary method 700 is illustrated and described herein as a series of blocks representative of various events and/or acts, the present invention is not limited by the illustrated ordering of such blocks. For instance, some acts or events can occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 700 and other methods according to the invention can be implemented in association with the apparatus and systems illustrated and described herein,,as well as in association with other systems and apparatus not illustrated or described.

At 704, film and process parameters associated with an unpatterned wafer are obtained, and an optical constant associated with the unpatterned wafer is measured at 706 using an off-line spectroscopic ellipsometer. At 708, metrology instrument parameters associated with a process measurement system are obtained. Thereafter, a model is generated or created at 710 according to the measured optical constant and the metrology system parameters. Finally at 712, the model is provided to a process measurement system via a network before the method ends at 714.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", with, "has", "having", and variants thereof are used in either the detailed description or the claims, these terms are intended to be inclusive in a manner similar to the term "comprising."

What is claimed is:

1. A method of evaluating parameters of a semiconductor wafer as part of a manufacturing process comprising the steps of:
    measuring a plurality of reference wafers with an off-line scatterometer;
    determining the parameters of the reference wafers based on the measurements;
    using a model and the results of the determining step, to generate a library of calculated signatures, each corresponding to a different parameter set;
    measuring a test wafer with a integrated scatterometer, said integrated scatterometer being integrated with a process tool; and
    comparing the results of the measurement of the test wafer to the library of signatures to evaluate the parameters of the test wafer.

2. A method as recited in claim 1, wherein the parameters include critical dimensions.

3. A method as recited in claim 1, wherein the parameters include overlay registration.

4. A method as recited in claim 1, wherein the parameters include the temperature uniformity of a bake process step.

5. A lithograph track processing apparatus comprising:
    a stand-alone scatterometer, said scatterometer for measuring reference wafers and based on the measurements generating information corresponding to one of a measurement recipe and a library of signatures corresponding to parameter sets; and
    a scatterometer integrated with a lithographic track processing tool, said integrated scatterometer for measuring a test wafer and evaluating process parameters of the test wafer using the measurement of the test wafer and said information received from the stand-alone tool.

6. An apparatus as recited in claim 5, wherein the parameters include critical dimensions.

7. An apparatus as recited in claim 5, wherein the parameters include overlay registration.

8. An apparatus as recited in claim 5, wherein the parameters include the temperature uniformity of a bake process step.

9. An apparatus as recited in claim 5, wherein said stand-alone scatterometer and said integrated scatterometer are connected by a network.

10. A lithograph track processing apparatus comprising:
    a stand-alone scatterometer, said scatterometer for measuring reference wafers and using the measurements and a model, to generate a library of calculated signatures each corresponding to a different parameter set; and
    a scatterometer integrated with a lithographic track processing tool, said integrated scatterometer for measuring a test wafer and evaluating process parameters of test wafer based on the measurement of the test wafer and the library received from the stand-alone scatterometer.

11. An apparatus as recited in claim 10, wherein the parameters include critical dimensions.

12. An apparatus as recited in claim 10, wherein the parameters include overlay registration.

13. An apparatus as recited in claim 10, wherein the parameters include the temperature uniformity of a bake process step.

14. An apparatus as recited in claim 10, wherein said stand-alone scatterometer and said integrated scatterometer are connected by a network.

* * * * *